United States Patent
Choi et al.

(10) Patent No.: US 10,651,668 B2
(45) Date of Patent: May 12, 2020

(54) APPARATUS AND METHOD FOR CONTROLLING POWER

(71) Applicant: Samsung Electronics Co., Ltd., Suwon-si, Gyeonggi-do (KR)

(72) Inventors: Youngjun Choi, Seoul (KR); Seungmin Lee, Suwon-si (KR); Heon Chol Kim, Seoul (KR); Ikhyun Cho, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 15/056,296

(22) Filed: Feb. 29, 2016

(65) Prior Publication Data
US 2016/0254681 A1 Sep. 1, 2016

(30) Foreign Application Priority Data

Mar. 1, 2015 (KR) .................. 10-2015-0028756

(51) Int. Cl.
*H02J 7/00* (2006.01)
*G06F 1/16* (2006.01)
(Continued)

(52) U.S. Cl.
CPC .............. *H02J 7/007* (2013.01); *G06F 1/163* (2013.01); *G06F 1/263* (2013.01); *G06F 1/266* (2013.01);
(Continued)

(58) Field of Classification Search
CPC ... G09G 2380/02; G09G 5/373; H04M 1/725; H04M 1/72561; A61B 5/0816;
(Continued)

(56) References Cited

U.S. PATENT DOCUMENTS 6,727,865 B1   4/2004  Yonezawa
7,301,648 B2   11/2007 Foxlin
(Continued)

FOREIGN PATENT DOCUMENTS

CN    101742981 A    6/2010
CN    104113099 A    10/2014
(Continued)

OTHER PUBLICATIONS

Chinese National Intellectual Property Administration Office Action dated Oct. 9, 2019, issued in Chinese Application No. 201680012785.1.
(Continued)

*Primary Examiner* — Binh C Tat
(74) *Attorney, Agent, or Firm* — Jefferson IP Law, LLP

(57) ABSTRACT

A power control method and an electronic device and/or connecting unit to implement the power control method is provided. The electronic device includes a first interface unit configured to be connected to an external device that can receive and provide power to the electronic device, a second interface unit configured to be connected to an external charger that can provide power for the external device and the electronic device, and a main controller configured to detect whether or not the external charger is connected, and receive and direct power from the external device or the external charger according to whether or not the external charger is connected.

14 Claims, 11 Drawing Sheets

(51) Int. Cl.
    *G06F 1/26*     (2006.01)
    *G06F 1/3231*     (2019.01)
    *G06F 1/3287*     (2019.01)
    *A45F 5/02*     (2006.01)

(52) U.S. Cl.
    CPC .......... *G06F 1/3231* (2013.01); *G06F 1/3287* (2013.01); *H02J 7/0029* (2013.01); *A45F 5/02* (2013.01); *Y02D 10/171* (2018.01); *Y02D 10/173* (2018.01)

(58) Field of Classification Search
    CPC ......... A61B 5/01; A61B 5/024; A61B 5/0008; A61B 5/0022; A61B 5/1135; A61B 5/6803; H04W 8/005; G04G 21/02; H05K 2201/10151; H05K 2201/10037; H01M 10/443; H01M 10/486
    USPC .................................................. 320/149–164
    See application file for complete search history.

(56) References Cited

U.S. PATENT DOCUMENTS

| | | | |
|---|---|---|---|
| 2008/0200774 A1 | 8/2008 | Luo | |
| 2010/0293302 A1 | 11/2010 | Fujii et al. | |
| 2012/0052905 A1* | 3/2012 | Lim | G06F 3/015 |
| | | | 455/550.1 |
| 2012/0139474 A1* | 6/2012 | Cho | G09G 3/2092 |
| | | | 320/106 |
| 2012/0302289 A1* | 11/2012 | Kang | G06F 3/011 |
| | | | 455/557 |
| 2013/0229338 A1 | 9/2013 | Sohn et al. | |
| 2014/0183974 A1 | 7/2014 | Proefrock et al. | |
| 2014/0306658 A1* | 10/2014 | Kinomura | B60L 11/1838 |
| | | | 320/109 |
| 2014/0312829 A1 | 10/2014 | Ha et al. | |
| 2015/0029088 A1 | 1/2015 | Kim et al. | |
| 2015/0236528 A1* | 8/2015 | Kim | H02J 7/007 |
| | | | 320/107 |
| 2015/0341482 A1* | 11/2015 | Lee | H04M 1/72569 |
| | | | 455/550.1 |
| 2016/0056647 A1* | 2/2016 | Choi | H02J 7/0045 |
| | | | 320/107 |

FOREIGN PATENT DOCUMENTS

| | | |
|---|---|---|
| EP | 2 733 597 A2 | 5/2014 |
| KR | 10-2011-0085513 A | 7/2011 |

OTHER PUBLICATIONS

Indian Office Action dated Jan. 28, 2020; Indian Appln. No. 201737034667.

* cited by examiner

APPARATUS AND METHOD FOR CONTROLLING POWER

CROSS-REFERENCE TO RELATED APPLICATION(S)

This application claims the benefit under 35 U.S.C. § 119(a) of a Korean patent application filed on Mar. 1, 2015 in the Korean Intellectual Property Office and assigned Serial number 10-2015-0028756, the entire disclosure of which is hereby incorporated by reference.

TECHNICAL FIELD

The present disclosure relates to a power control method and an apparatus thereof.

BACKGROUND

With the development of digital technology, various electronic devices have been produced that can perform communication and personal information processing while moving, such as mobile communication terminals, personal digital assistants (PDAs), electronic personal organizers, smart phones, tablet personal computers (PCs), or the like. Such electronic devices may adopt various functions and provide various services, such as voice calls, messaging (e.g., short message service (SMS)/multimedia message service (MMS)), video calls, electronic personal organizers, photographing, transmission and reception of e-mails, reproduction of broadcasts, Internet functions, reproduction of music, calendars, social networking services (SNS), messengers, dictionaries, or games.

At the same time, a wearable device, which is a kind of electronic device to be used while being worn on the user's body, has been developed. For example, the wearable devices may be implemented in various forms in order to be attached to, or detached from, the user's body part or clothing, such as head-mounted displays, smart glasses, smart watches, wristbands, contact lens-type devices, ring-type devices, shoe-type devices, garment-type devices, glove-type devices, or the like. Such wearable devices may be connected to the electronic devices to then be used.

Since the connecting devices, such as the wearable devices of the related art, have no external port, the power may be supplied by only the connected electronic devices and it is impossible to use external power sources. In the case of an electronic device having a low battery, a connecting device cannot be used because the electronic device is not able to supply the power to the connecting device.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a power control method and an electronic device and/or connecting unit to implement the power control method.

In accordance with an aspect of the present disclosure, an electronic device is provided. The electronic device includes a first interface unit configured to be connected to an external device, a second interface unit configured to be connected to an external charger, and a main controller configured to detect whether the external charger is connected, and control a receipt of power from the external device or the external charger according to whether the external charger is connected.

In accordance with another aspect of the present disclosure, a power control method of an electronic device is provided. The power control method includes detecting a connection of an external device, operating by using the power of the external device, detecting an external power input during the operation, transmitting state information according to the external power input to the external device, and operating by using the external power.

In accordance with another aspect of the present disclosure, a power control method of an electronic device is provided. The power control method includes detecting a connection of an external device, outputting the power to the external device, receiving state information from the external device, and stopping the power output based on the state information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
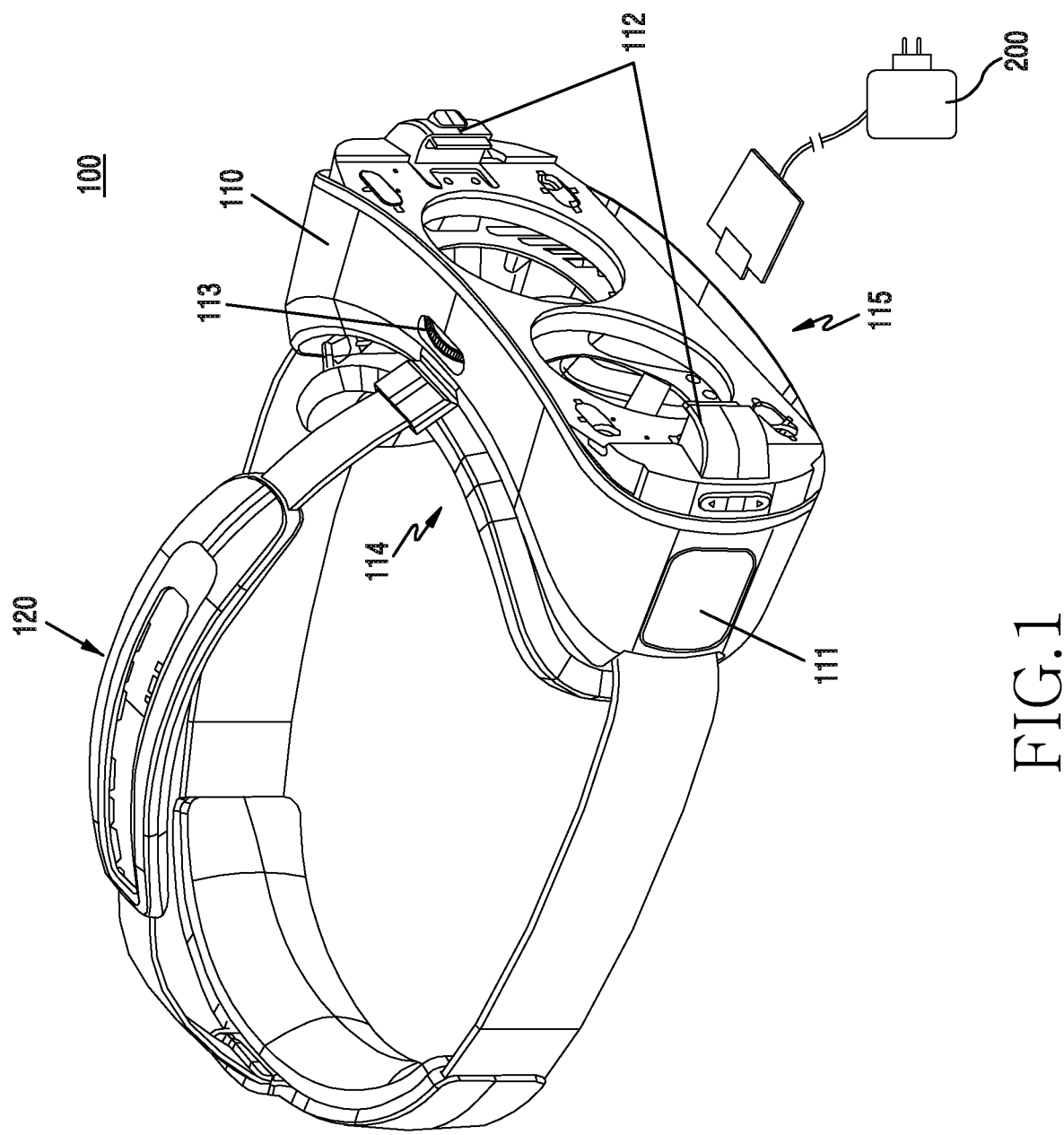
FIG. 1 is a perspective view illustrating a connection of a head-mounted-type (HMT) device and an external charger according to various embodiments of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In the present disclosure, the expression "have", "may have", "include" or "may include", refers to the existence of a corresponding feature (e.g., numerical value, function, operation, or components such as elements), but does not exclude existence of additional features.

In the present disclosure, the expression "A or B", "at least one of A or/and B", or "one or more of A or/and B" may include all possible combinations of the items listed. For example, the expression "A or B", "at least one of A and B", or "at least one of A or B" may include (1) at least one A, (2) at least one B, or (3) both at least one A and at least one B.

The expression "a first", "a second", "the first", or "the second", used in various embodiments of the present disclosure may modify various elements regardless of order or importance, and do not limit corresponding elements. The above expressions may be used merely for the purpose of distinguishing an element from the other elements. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being operatively or communicatively "connected," or "coupled," to another element (e.g., second element), it may be directly connected or coupled directly to the other element, and any other element (e.g., third element) may be interposed between them. In contrast, it may be understood that when an element (e.g., first element) is referred to as being "directly connected," or "directly coupled" to another element (e.g., second element), there are no elements (e.g., third element) interposed between them.

As used herein, the expression "configured to" may be interchangeably used with the expression "suitable for", "having the capability to", "designed to", "adapted to", "made to", or "capable of". The term "configured to" may not necessarily imply "specifically designed to" in hardware form. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) for performing only the corresponding operations, or a generic-purpose processor (e.g., central processing unit (CPU) or application processor (AP)) that can perform the corresponding operations by executing one or more software programs stored in a memory device.

Unless defined otherwise, all terms used herein, including technical and scientific terms, have the same meaning as those commonly understood by a person skilled in the art to which the present disclosure pertains. Such terms as those defined in a generally used dictionary are to be interpreted to have meanings equal to the contextual meanings in the relevant field of the art, and are not to be interpreted to have ideal or excessively formal meanings unless clearly defined in the present disclosure. In some cases, even the terms defined in the present disclosure should not be interpreted to exclude embodiments of the present disclosure.

Various embodiments of the present disclosure may include all types of devices having a display function. For example, an electronic device may include at least one of a smartphone, tablet personal computer (PC), mobile phone, video phone, electronic book reader (e-book reader), personal digital assistant (PDA), portable multimedia player (PMP), Moving Picture Experts Group phase 1 or phase 2 (MPEG-1 or MPEG-2) audio layer-3 (MP3) player, and camera. In various embodiments, the electronic device may be a combination of one or more of the aforementioned various devices. Further, the electronic device according to an embodiment of the present disclosure is not limited to the aforementioned devices, and may include a new, modified or improved electronic device according to the developments of technology in each area.

A head-mounted-type (HMT) device, according to various embodiments of the present disclosure, may be a device that is attached to, or worn around the user's face or eyes to display images. The HMT device may provide at least one of a see-through function for providing an augmented reality (AR) or a see-closed function for providing a virtual reality (VR). The see-through function may display external real images to the user's eyes through a display while providing additional information or images as a single image in real time. The see-closed function may provide, as images, only the content that is provided through the display.

Hereinafter, in describing an HMT device that performs an operation related to the reception and supply of power, an electronic device may be interpreted as an external device that is connected to the HMT device. In addition, in describing the electronic device that performs an operation related to the reception and supply of power, the HMT device may be interpreted as an external device that is connected to the electronic device.

Various embodiments provide a method and apparatus that adopt an interface unit that can be connected to an external charger in order to receive power from the external charger.

FIG. 1 is a perspective view of a connection of an HMT device and an external charger according to various embodiments of the present disclosure.

Referring to FIG. 1, an HMT device 100 may include a main frame 110 that is configured to be coupled to, or detached from, an electronic device, such as a smart phone, and a fastening member 120 that is connected with the main frame 110 to fix the main frame 110 to the user's body part.

The main frame 110 may include a user input module 111 that may control the electronic device, a first interface unit 112 that is connected to the electronic device, a display position adjusting unit 113, a proximity sensor 114, and a second interface unit 115 that is connected to an external charger 200 or an external input/output device (not shown).

According to various embodiments, the user input module 111 may include at least one of a physical key, physical buttons, a touch key, joystick, wheel key, or touch pad. In the case where the user input module 111 is a touch pad, the touch pad may be disposed on a side of the main frame 110. The touch pad may include control objects (e.g., a graphical user interface (GUI) for controlling audio signals or videos), which show the functions of the electronic device or the HMT device 100.

The first interface unit 112 may support a communication with the electronic device. The first interface unit 112 may be connected to an interface unit (e.g., a universal serial bus (USB) port) of the electronic device, and may transfer user input signals generated in the user input module 111 to the electronic device. For example, the first interface unit 112 may transmit a user input signal (e.g., a touch input) that is received from the user input module 111 to the electronic device. The electronic device may perform a function corresponding to the touch input. For example, the electronic device may adjust the volume or may reproduce videos in response to the touch input.

The proximity sensor 114 may sense the approach of an object in a contactless manner to detect a position thereof. For example, if an object (e.g., a user's body part) is detected within a specific sensing distance, the proximity sensor 114 may transmit the detected signal to a main controller of the HMT device 100. If no object is detected within a specific sensing distance, the proximity sensor 114 may not transmit any signal to the main controller. The main controller may determine that the user is wearing the HMT device 100 based on the signal detected by the proximity sensor 114. The proximity sensor 114 may be mounted on an upper portion of an inner side of the main frame 110 so that the proximity sensor 114 becomes close to a forehead of the user when the user puts on the HMT device 100 in order to easily detect the wearing of the HMT device 100.

Although a proximity sensor is disclosed in the present disclosure, other sensors that can detect the wearing of the HMT device 100 may be used according to various embodiments. For example, the main frame 110 may have at least one of an acceleration sensor, gyro sensor, geomagnetic sensor, gesture sensor, biometric sensor, touch sensor, illuminance sensor, or grip sensor, which is mounted thereon and which can separately, or in combinations, detect the wearing of the HMT device 100.

The second interface unit 115 may be connected with the external charger 200 or the external input/output device. For example, if the second interface unit 115 is connected to the external charger 200, it may receive power from the external charger 200. The received power may be used as an operation power of the HMT device 100, and may be transmitted to the electronic device. Alternatively, in the case where the second interface unit 115 is connected to the external input/output device, the second interface unit 115 may receive an external input signal from the external input/ output device, and may transmit the same to the main controller of the HMT device 100.

The main frame 110 may be configured to be coupled to, or detached from, the external device, such as the electronic device. For example, the main frame 110 may have a space, structure, or cavity, which is able to accept the electronic device. The portion constituting the space of the main frame 110 may include an elastic or adhesive material. The portion constituting the space of the main frame 110 may adopt flexible materials such that the size of the space can be changed in order to accept various sizes of electronic devices.

A back side (i.e., the inner side) of the main frame 110 may further include a face contacting member that comes into contact with the user's face, and a lens assembly, which includes one or more lenses, may be inserted into the face contacting member at the position corresponding to the user's eyes. A display or transparent/translucent lenses may be integrally fixed to the lens assembly, or may be detachably coupled to the lens assembly. A nose recess, which is shaped to receive a user's nose, may also be formed on a portion of the face contacting member.

The main frame 110 may be made of a material that allows the user to feel comfortable when it is attached, and that supports the electronic device, such as a plastic material. In another embodiment, the main frame 110 may include at least one of glass, ceramic, metal (e.g., aluminum), or metal alloys (e.g., steel, stainless steel, titanium or a magnesium alloy) in consideration of strength or appearance.

The fastening member 120 may be worn on the user's body part. The fastening member 120 may be formed of a band that is made of an elastic material. According to various embodiments, the fastening member 120 may include features to accommodate eyeglasses, helmets, or straps.

Figure 2:
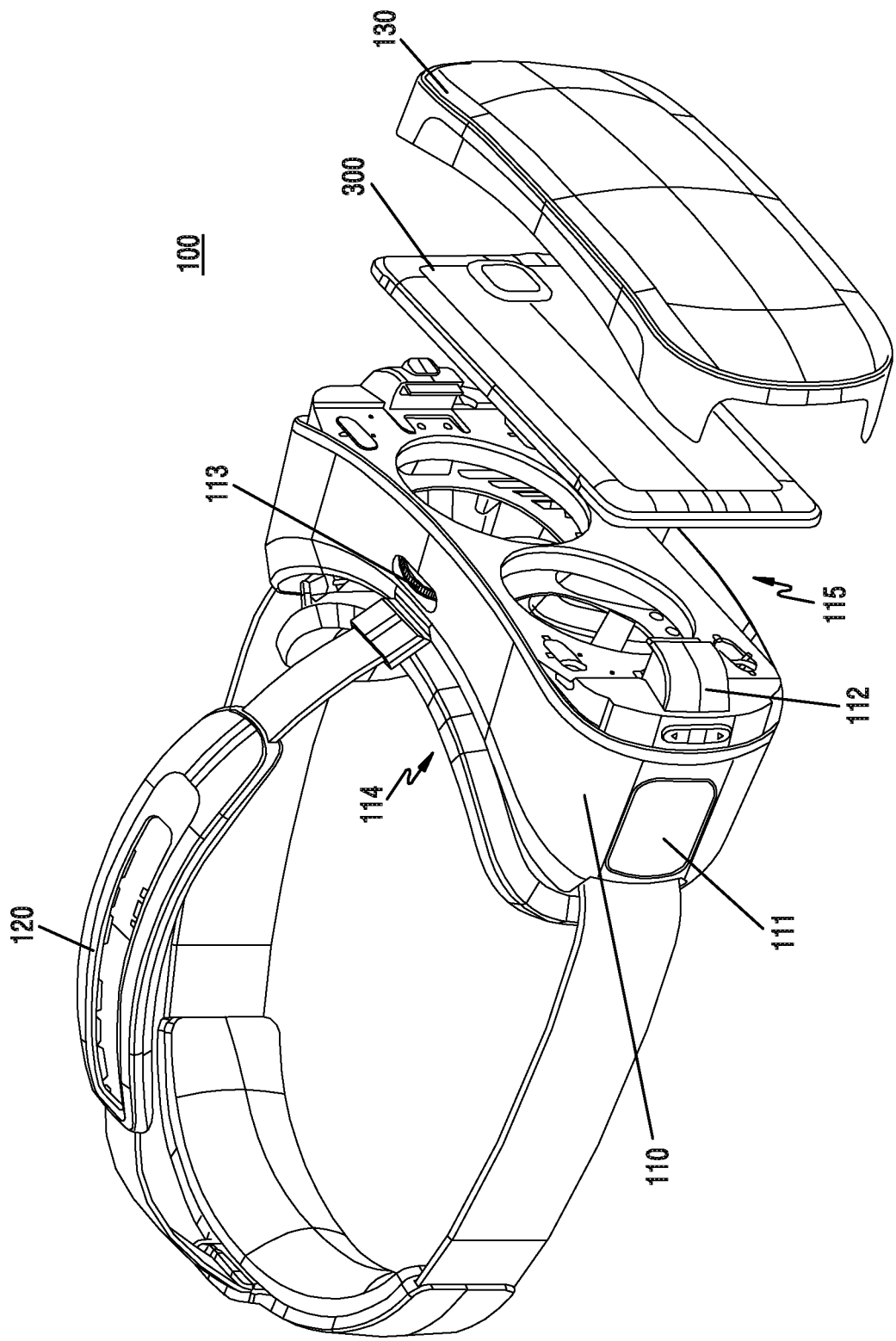
FIG. 2 is a perspective view illustrating a connection of an HMT device and an electronic device according to various embodiments of the present disclosure.

FIG. 2 is a perspective view of a connection of an HMT device and an electronic device according to various embodiments of the present disclosure.

Referring to FIG. 2, an HMT device 100 may further include an electronic device 300 that is coupled to the main frame 110 and a cover 130 for fixing the electronic device 300 to the main frame 110. The cover 130 may be combined with the main frame 110 through a physical connection, such as a hook, or by using a magnet or an electromagnet. The cover 130 may prevent the electronic device 300 from falling out of the main frame 110 or otherwise becoming displaced due to the motion of the user, and may protect the electronic device 300 from external impact.

The electronic device 300 may be coupled to the main frame 110 such that a display thereof faces the main frame 110. The users may couple the electronic device 300 to the first interface unit 112 of the main frame 110, and then may put the cover 130 thereon in order to complete the assembly of the HMT device 100.

Figure 3:
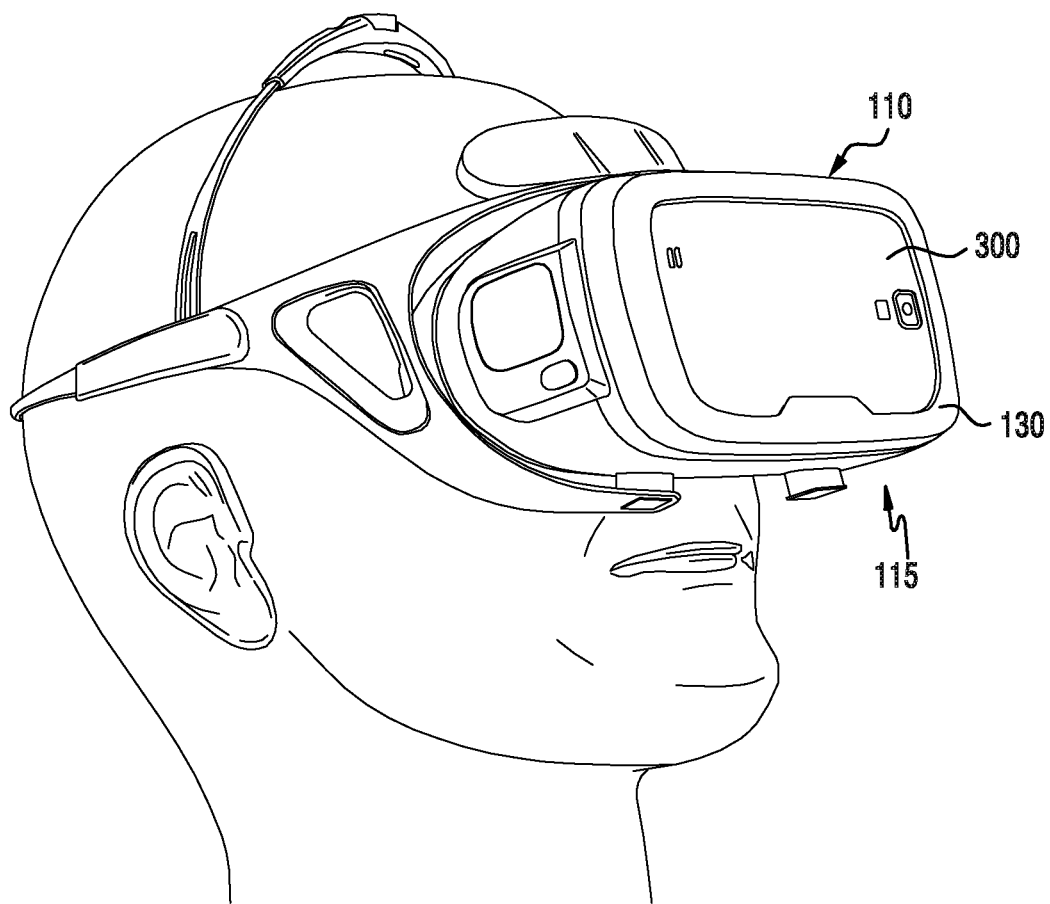
FIG. 3 illustrates a state in which a user wears an HMT device according to various embodiments of the present disclosure.

FIG. 3 illustrates a state in which a user wears an HMT device according to various embodiments of the present disclosure.

Referring to FIG. 3, an electronic device 300 may be coupled to a main frame 110 such that a display thereof faces the main frame 110. When a user wears the HMT device 100, the user is able to view the screen of the electronic device 300.

Figure 4:
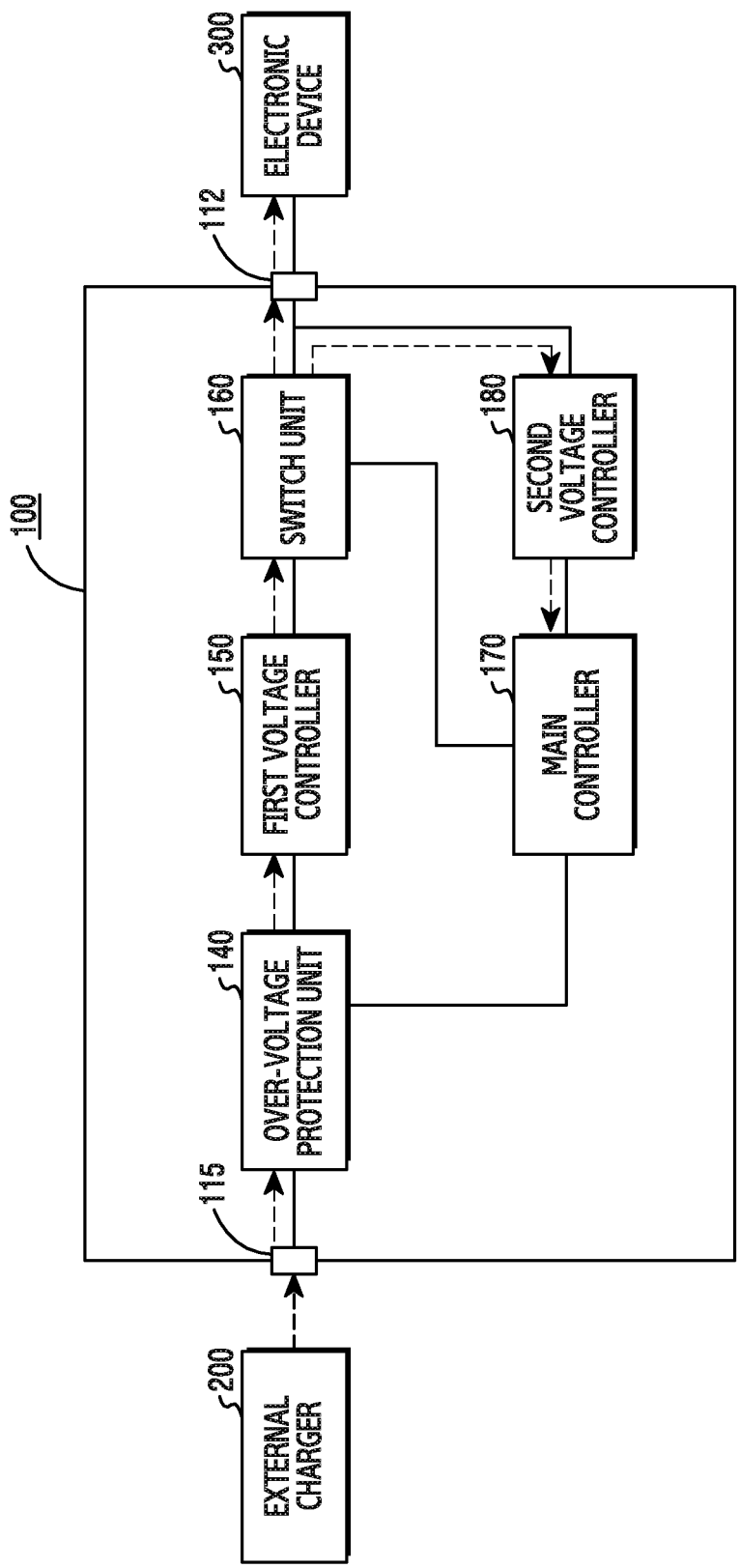
FIG. 4 is a block diagram of an HMT device according to various embodiments of the present disclosure.

FIG. 4 is a block diagram of an HMT device according to various embodiments of the present disclosure.

Referring to FIG. 4, an HMT device 100 may include the first interface unit 112, the second interface unit 115, an over-voltage protection unit 140, a first voltage controller 150, a switch unit 160, a main controller 170, and a second voltage controller 180. Dotted arrow lines in FIG. 4 denote a direction of power flow according to various embodiments of the present disclosure.

The first interface unit 112 may be connected with the electronic device 300. For example, the first interface unit 112 may be connected to the interface unit of the electronic device 300, and may transfer user input signals, which are generated in the user input module 111 of FIG. 1, to the electronic device 300.

The second interface unit 115 may be connected with the external charger 200 or the external input/output device (not shown). For example, the second interface unit 115 may be connected with the external charger 200 in order to receive power from the external charger 200. In addition, the power supplied from the external charger 200 may be transferred to the electronic device 300 through the first interface unit 112. Alternatively, the second interface unit 115 may be connected with the external input/output device to receive external input signals from the external input/output device and to transfer the same to the main controller 170. In addition, the second interface unit 115 may receive device information on the external input/output device (e.g., a device identifier (ID), the operation power, or the like). The device information may be transmitted to the electronic device 300 through the first interface unit 112. When the device information is received, the electronic device may further supply the operation power of the external input/output device. The second interface unit 115 may transfer the power supplied from the electronic device 300 to the external input/output device.

The over-voltage protection unit 140 may prevent the malfunction of the HMT device 100 due to any sharp increase in the voltage. For example, when the external charger 200 is connected through the second interface unit 115 to supply power, the over-voltage protection unit 140 may play a role of preventing an abrupt increase in the supplied voltage. The over-voltage protection unit 140 may limit the voltage of the power supplied from the external charger 200 to be less than a predetermined voltage.

The first voltage controller 150 may control the voltage that is received through the over-voltage protection unit 140. The first voltage controller 150 serves to adjust the voltage supplied from the external charger 200 to a specific value. For example, the first voltage controller 150 may increase or reduce the voltage supplied from the over-voltage protection unit 140 in order to thereby adjust the same to a constant voltage (e.g., 5 V). The adjusted voltage may be supplied to the electronic device 300 or the second voltage controller 180 through the switch unit 160. For example, the first voltage controller 150 may be a "Buck-Boost converter", but embodiments are not limited thereto. A configuration of a Buck-Boost converter are known to those skilled in the art, therefore further detail is omitted.

The switch unit 160 may be turned on/off depending on the connection with the external charger 200 under the control of the main controller 170. When the switch unit 160, which is in the off-state, is connected to the external charger 200, it may be turned on.

The main controller 170 may control the overall operations of the HMT device 100, signal flows between internal elements of the HMT device 100, and the power supply to the elements, and may perform data processing. For example, the main controller 170 may be a micro-controller unit (MCU), but embodiments are not limited thereto.

The main controller 170 may monitor the over-voltage protection unit 140 in order to thereby determine whether or not the external charger 200 has been connected through the second interface unit 115. If the voltage is applied to the over-voltage protection unit 140, the main controller 170 may determine that the external charger 200 has been connected. For example, if the external charger 200 is connected, the main controller 170 may turn on the switch unit 160 in order to control the power supplied from the external charger 200 to be applied to the electronic device 300 and the second voltage controller 180. If the external charger 200 is disconnected, the main controller 170 may turn off the switch unit 160 so that the power may be supplied again from the electronic device 300. The supplied power may be transferred to the second voltage controller 180 rather than the first voltage controller 150.

The second voltage controller 180 may control the voltage that is received from the external charger 200 or the electronic device 300. That is, like the first voltage controller 150, the second voltage controller 180 may adjust the voltage supplied from the external charger 200 or the electronic device 300 to a constant value. The adjusted voltage is supplied to the main controller 170. For example, the second voltage controller 180 may be a "low drop out regulator", but embodiments are not limited thereto. A configuration of a low drop out regulator are known to those skilled in the art, therefore further detail is omitted.

According to various embodiments, the over-voltage protection unit 140, first voltage controller 150, switch unit 160, and second voltage controller 180, may be configured as a single module. According to various embodiments, the over-voltage protection unit 140, first voltage control section 150, and switch unit 160 may be configured as a single module, and the second voltage controller 180 may be configured separately.

Figure 5:
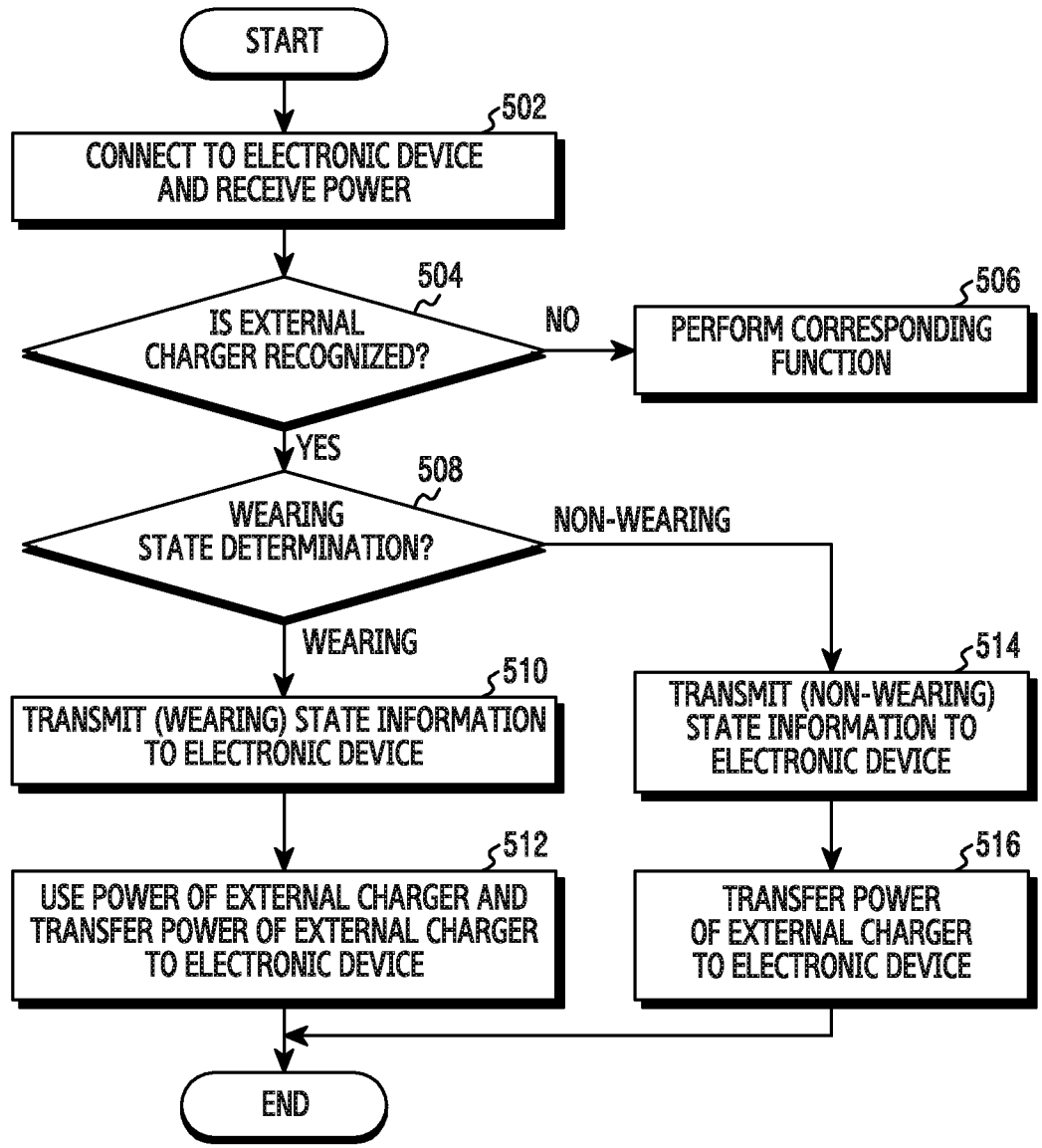
FIG. 5 is a flowchart illustrating a power control method of an HMT device according to various embodiments of the present disclosure.

FIG. 5 is a flowchart illustrating a power control method of an HMT device according to various embodiments of the present disclosure.

Referring to FIG. 5, in operation 502, an HMT device 100 may be connected to an electronic device 300 in order to thereby receive power from the electronic device 300. When the electronic device 300 is connected to the first interface unit 112 of the HMT device 100, the voltage may be applied to the main controller 170 through the second voltage controller 180.

In operation 504, the main controller 170 may determine whether or not an external charger 200 is connected. The main controller 170 may monitor the over-voltage protection unit 140 in order to recognize whether or not a connection port of the external charger 200 has been inserted into the second interface unit 115. When the connection port of the external charger 200 is inserted into the second interface unit 115, the voltage is applied to the over-voltage protection unit 140. When the voltage is applied to the over-voltage protection unit 140, the main controller 170 may determine that the external charger 200 has been connected. The main controller 170 may inform the electronic device 300 of the connection of the external charger 200.

If the external charger 200 is not connected, the main controller 170 continues to receive power from the electronic device 300, and to operate in operation 506. If the external charger 200 is not connected, the switch unit 160 remains in the off-state.

If the external charger 200 is connected, the main controller 170 may determine whether or not the HMT device 100 is currently being worn in operation 508. The wearing of the HMT device 100 may be determined by using a signal detected by the proximity sensor 114. The proximity sensor 114 may detect an object within a predetermined sensing distance and then transmit the detected signal to the main controller 170. When the detected signal is received from the proximity sensor 114, the main controller 170 may determine that the HMT device 100 is being worn. If the proximity sensor 114 detects nothing within the predetermined sensing distance, the proximity sensor 114 may not transmit any signal to the main controller 170. If no signal is received from the proximity sensor 114 after the external charger 200 is connected, the main controller 170 may determine that the HMT device 100 is not being worn.

If the HMT device 100 is being worn, the main controller 170 may transmit state information to the electronic device 300 in operation 510. The state information may contain at least one of external power input information, wearing state information, and non-wearing state information. The external power input information shows that the HMT device 100 has been connected with the external charger 200. The wearing state information shows a state in which the user is wearing the HMT device 100. The non-wearing state information shows a state in which the user does not wear the HMT device 100. In operation 510, the state information may be the external power input information and the wearing state information. When the external power input information and the wearing state information are received, the electronic device 300 may stop the power supply to the HMT device 100.

According to various embodiments, even when the HMT device 100 is worn, the main controller 170 may transfer the power supplied from the external charger 200 to the electronic device 300 or the HMT device 100. For example, the main controller 170 may reduce a charging current of the power supplied from the external charger 200, and may then charge the electronic device 300 or the HMT device 100. The charging current of the power supplied from the external charger 200 is reduced in order to prevent heat generated by the electronic device 300 or the HMT device 100. According to various embodiments, even when the user wears the HMT device 100, the electronic device 300 or the HMT device 100 may be charged. According to various embodiments, the electronic device 300 may stop the power supply to the HMT device 100 by itself, or the HMT device 100 may block the power supplied from the electronic device 300.

In operation 512, the main controller 170 may receive and use power from the external charger 200, and may control the transfer of the power from the external charger 200 to the electronic device 300. For example, the main controller 170 may turn on the switch unit 160 so that the power supplied from the external charger 200 is applied to the electronic device 300 and the second voltage controller 180.

Alternatively, the electronic device 300 may stop the power supply by itself when heat is generated during the power supply from the external charger 200. When heat is generated by the HMT device 100, the main controller 170 may stop the power supply to the electronic device 300. That is, in the case of heat generation from the HMT device 100, the main controller 170 may control the voltage supplied from the external charger 200 to only the second voltage controller 180 instead of the electronic device 300.

If the HMT device 100 is not being worn, the main controller 170 may transmit the state information to the electronic device 300 in operation 514. The state information may be the external power input information and the non-wearing state information. When the external power input information and the non-wearing state information are received, the electronic device 300 may determine that the HMT device 100 is not in use. In this case, the electronic device 300 may stop the power supply to the display panel and the HMT device 100.

In operation 516, the main controller 170 may control the power supplied from the external charger 200 to bypass the HMT device, and to be applied only to the electronic device 300. The electronic device 300 may charge its battery during this time by using the received power.

Figure 6:
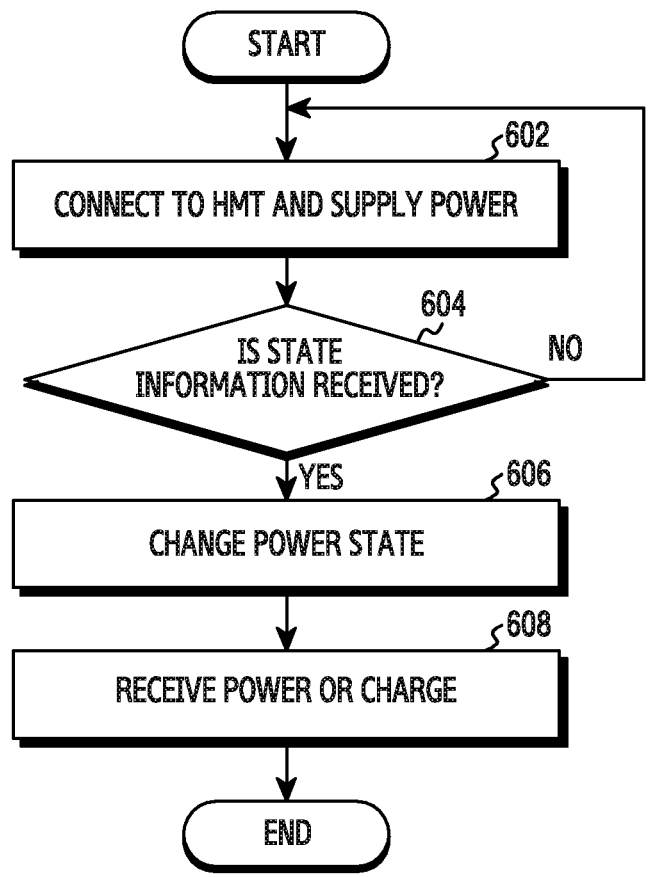
FIG. 6 is a flowchart illustrating a power control method of an electronic device according to various embodiments of the present disclosure.

FIG. 6 is a flowchart illustrating a power control method of an electronic device according to various embodiments of the present disclosure.

Referring to FIG. 6, in operation 602, an electronic device 300 may be connected to an HMT device 100 in order to thereby supply power to the HMT of device 100. When the first interface unit 112 of the HMT device 100 is inserted into the interface unit, the electronic device 300 may recognize the HMT device 100, and may supply power to the HMT device 100. At this time, the power state of the electronic device 300 is a "supply mode." The electronic device 300 may output the voltage stored in a battery to the first interface unit 112. The electronic device 300 may turn on a switch between the battery and a charging integrated circuit (IC) in order to thereby output the voltage stored in the battery to the first interface unit 112. The switch may be implemented in software, hardware, or combination thereof.

In operation 604, the electronic device 300 may determine whether or not state information is received from the HMT device 100. If the state information is not received, the electronic device 300 may continue to perform operation 602. The state information may contain at least one of external power input information, wearing state information, or non-wearing state information.

If the state information is received, the electronic device 300 may change the power state in operation 606. The electronic device 300 may change the power state from the supply mode to a "stop mode." When the power state is changed to the stop mode, the electronic device 300 may stop the power supply to the HMT device 100. For example, the electronic device 300 may turn off the switch between the battery and the charging IC. When the switch is turned off, the voltage stored in the battery is not output.

In operation 608, the electronic device 300 may receive or charge the power. If the power state is changed to the stop mode, the electronic device 300 may use the received power as operation power. For example, the electronic device 300 may provide the received power to each element in the electronic device 300 except for the battery.

If the state information is the non-wearing state information, the electronic device 300 may change the power state into a "charging mode." When the power state is changed to the charging mode, the electronic device 300 may provide the power to each element in the electronic device 300, and may charge the battery by using the received power. At this time, the electronic device 300 may turn on the switch between the battery and the charging IC. In addition, the electronic device 300 may determine that the user is not using the HMT device 100, and may stop the power supply to a display panel. The power supply to the display panel is stopped so that the display panel is turned off.

In general, since the electronic device 300 tends to be heated during charging, the user may feel uncomfortable when the electronic device 300 is charging while the user is wearing the HMT device 100. Therefore, the electronic device 300 may selectively charge the battery only when the user does not wear the HMT device 100.

Although not shown in the drawings, the electronic device 300 may be configured to include a controller that controls the operations shown in FIG. 6, a display (e.g., a display panel), an input unit (for example, a touch panel, keys, etc.), a communication unit, an interface unit, a storage unit, a battery, a charging integrated circuit (IC), and a switch between the battery and the IC.

Figure 7:
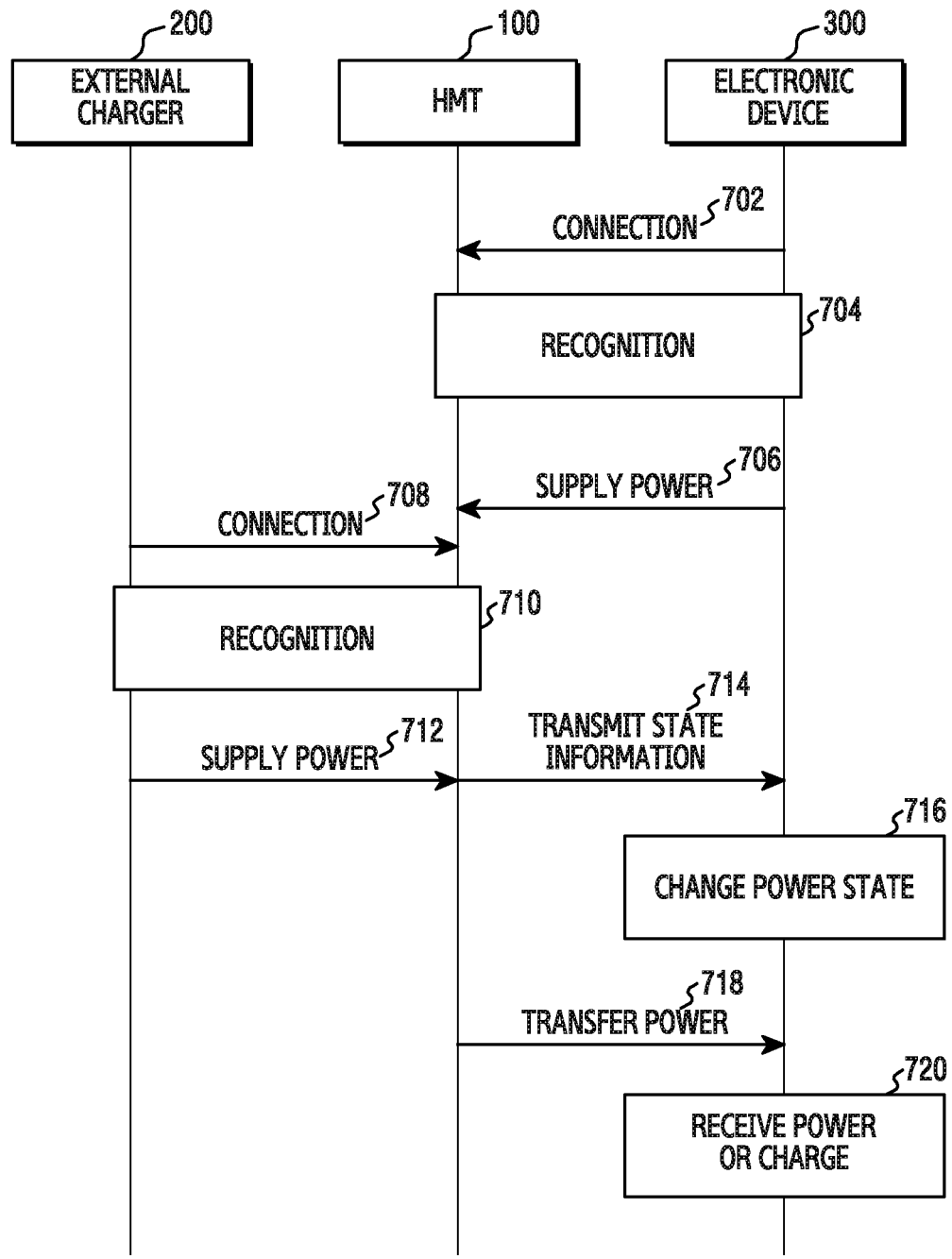
FIG. 7 is a flowchart illustrating a power control method between an external charger, an HMT device, and an electronic device according to various embodiments of the present disclosure.

FIG. 7 is a flowchart illustrating a power control method between an external charger, an HMT device, and an electronic device according to various embodiments of the present disclosure.

Referring to FIG. 7, in operation 702, an electronic device 300 may be connected to an HMT device 100.

In operation 704, when a connection port of the electronic device 300 is connected to the first interface unit 112, the HMT device 100 may recognize the electronic device 300.

In operation 706, the electronic device 300 may supply power to the HMT device 100. At this time, the electronic device 300 is in a power supply mode.

In operation 708, an external charger 200 may be connected to the HMT device 100.

In operation 710, when the connection port of the external charger 200 is connected to the second interface unit 115, the HMT device 100 may recognize the external charger 200.

In operation 712, the external charger 200 may supply power to the HMT device 100.

In operation 714, the HMT device 100 may transmit state information. The state information may contain at least one of external power input information, wearing state information, or non-wearing state information.

In operation 716, the electronic device 300 may change the power state. The electronic device 300 may change the power state from the supply mode to a stop mode.

In operation 718, the HMT device 100 may transfer power supplied from the external charger 200 to the electronic device 300.

In operation 720, the electronic device 300 may receive power to thereby charge the battery. When the power state is changed to the stop mode, the electronic device 300 may use the received power as the operation power of the electronic device 300. If the state information is the non-wearing state information, the electronic device 300 may change the power state into a "charging mode." When the power state is changed to the charging mode, the electronic device 300 may use the received power as operation power of the electronic device 300, and may charge the battery by using the received power.

Figure 8:
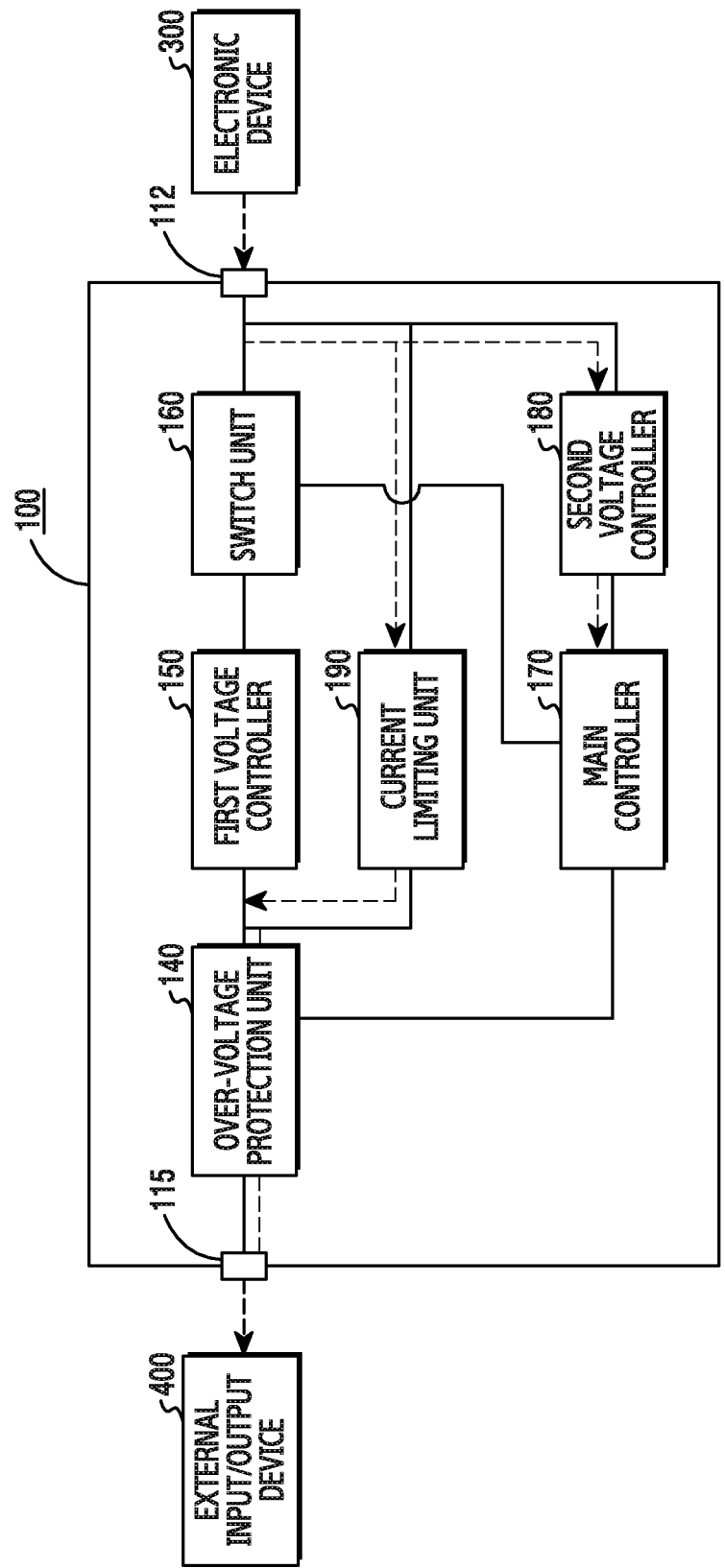
FIG. 8 is a block diagram of an HMT device according to various embodiments of the present disclosure.

FIG. 8 is a block diagram showing an HMT device according to various embodiments of the present disclosure.

Referring to FIG. 8, an HMT device 100 may include the first interface unit 112, the second interface unit 115, the over-voltage protection unit 140, the first voltage controller 150, the switch unit 160, the main controller 170, the second voltage controller 180, and a current limiting unit 190. Dotted arrow lines in FIG. 8 indicate the direction of power flow according to various embodiments of the present disclosure.

The elements included in FIG. 8 are the same as, or similar to, the elements included in FIG. 4. Hereinafter, the elements, which have been described in regard to FIG. 4, will be only briefly described.

The first interface unit 112 may be connected with the electronic device 300. The first interface unit 112 may transmit device information on the external charger 200 or on the external input/output device to the electronic device 300.

The second interface unit 115 may be connected to the external charger 200 (not shown) or the external input/output device 400. For example, the second interface unit 115 may receive, from the external input/output device 400, the device information (e.g., the device ID, the operation power, etc.) on the external input/output device 400. For example, the external input/output device 400 may be at least one of a keyboard, mouse, joystick, glove-type device, voice input device, wearable device, display device, speaker, speaker dock, or printer.

The over-voltage protection unit 140 may limit the power supplied from the external charger 200 to be equal to, or less than, a predetermined value.

The first voltage controller 150 may adjust the voltage that is received through the over-voltage protection unit 140 to a predetermined value.

The switch unit 160 may be turned on/off according to the connection with the external charger 200 under the control of the main controller 170.

The main controller 170 may control the overall operations of the HMT device 100, signal flows between internal elements of the HMT device 100, and the power supply to the elements, and may perform data processing. The main controller 170 may transmit the device information on the external input/output device 400 to the electronic device 300 through the first interface unit 112.

Like the first voltage controller 150, the second voltage controller 180 may adjust the voltage supplied from the external charger 200 or the electronic device 300 to a constant value.

The current limiting unit 190 may control the power supplied from the electronic device 300. The external input/output device 400 may be operated by the power supplied from the electronic device 300. Therefore, when the external input/output device 400 is connected to the second interface unit 115, the electronic device 300 may supply the operation power of the external input/output device 400 as well as the operation power of the HMT device 100. However, in order to reduce battery consumption of the electronic device 300, the current limiting unit 190 may limit the power to the external input/output device 400 to be equal to, or less than, a predetermined value.

Figure 9:
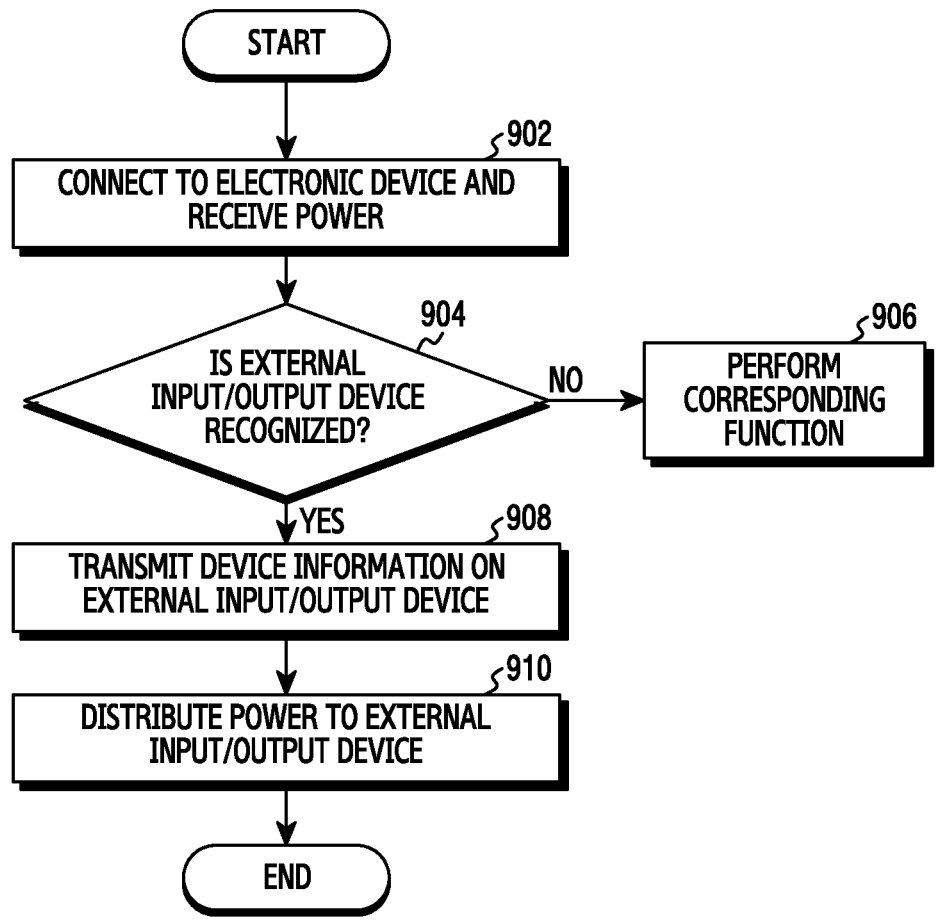
FIG. 9 is a flowchart illustrating a power distribution method of an HMT device according to various embodiments of the present disclosure.

FIG. 9 is a flowchart illustrating a power distribution method of an HMT device according to various embodiments of the present disclosure.

Referring to FIG. 9, in operation 902, a main controller 170 may be connected to an electronic device 300 in order to receive power from the electronic device 300.

In operation 904, the main controller 170 may determine whether or not an external input/output device 400 is recognized. The main controller 170 may recognize whether or not a connection port of the external input/output device 400 is inserted into the second interface unit 115.

If the external input/output device 400 is not connected, the main controller 170 may continue to receive power from the electronic device 300 to operate in operation 906.

If the external input/output device 400 is connected, the main controller 170 may transmit device information on the external input/output device 400 to the electronic device 300 through the first interface unit 112 in operation 908. The device information may contain a device ID and an operation power of the external input/output device 400. The electronic device 300 may adjust the power to be supplied to the HMT device 100 on the basis of the device information. For example, the electronic device 300 may supply the operation power of the HMT device 100 until the external input/output device 400 is connected, and when the external input/output device 400 is connected, may further increase the amount of power supply as much as required for the operation of the external input/output device 400 to be supplied.

In operation 910, the main controller 170 may distribute the power supplied from the electronic device 300 to the external input/output device 400. For example, the main controller 170 may distribute some of the power supplied from the electronic device 300 as the operation power of the HMT device 100, and may distribute as much power as required for the operation of the external input/output device 400 to the external input/output device 400.

Figure 10:
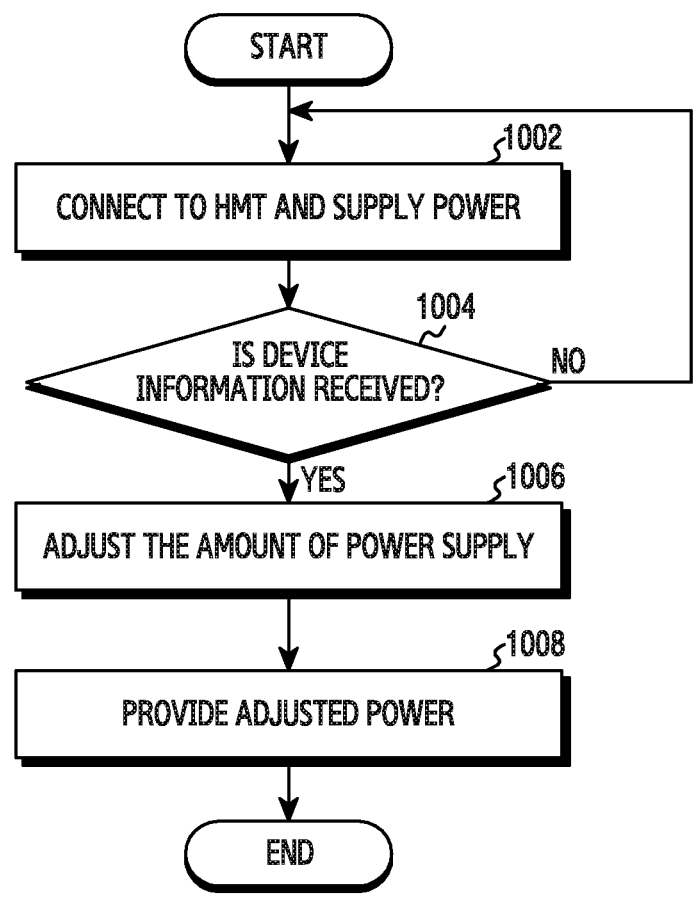
FIG. 10 is a flowchart illustrating a power control method of an electronic device according to various embodiments of the present disclosure.

FIG. 10 is a flowchart illustrating a power control method of an electronic device according to various embodiments of the present disclosure.

Referring to FIG. 10, in operation 1002, an electronic device 300 may be connected to an HMT device 100 in order to receive power from the HMT device 100. At this time, the electronic device 300 may supply as much power as necessary for the operation of the HMT device 100.

In operation 1004, the electronic device 300 may determine whether or not device information is received from the HMT device 100. If the device information is not received, the electronic device 300 may continue to perform the operation 1002.

If the device information is received, the electronic device 300 may adjust the amount of power supply in operation 1006. For example, if the external input/output device 400 is connected, the electronic device 300 may adjust the amount of power supply to be more than the power supplied in operation 1002.

In operation 1008, the electronic device 300 may provide the adjusted power to the HMT device 100. For example, the electronic device 300 may increase the amount of power supply as much as necessary for the operation of the external input/output device 400 to be supplied to the HMT device 100.

According to various embodiments, even when the HMT device 100 is worn, the electronic device 300 may use the power supplied from the external charger 200, or may supply the same to the HMT device 100. For example, the electronic device 300 may reduce the charging current of the power supplied from the external charger 200 for usage, or may charge the HMT device 100. The charging current of the power supplied from the external charger 200 is reduced in order to prevent heat that is generated by the electronic device 300 or the HMT device 100. According to various embodiments, even when the user wears the HMT device 100, the electronic device 300 or the HMT device 100 may be charged.

Figure 11:
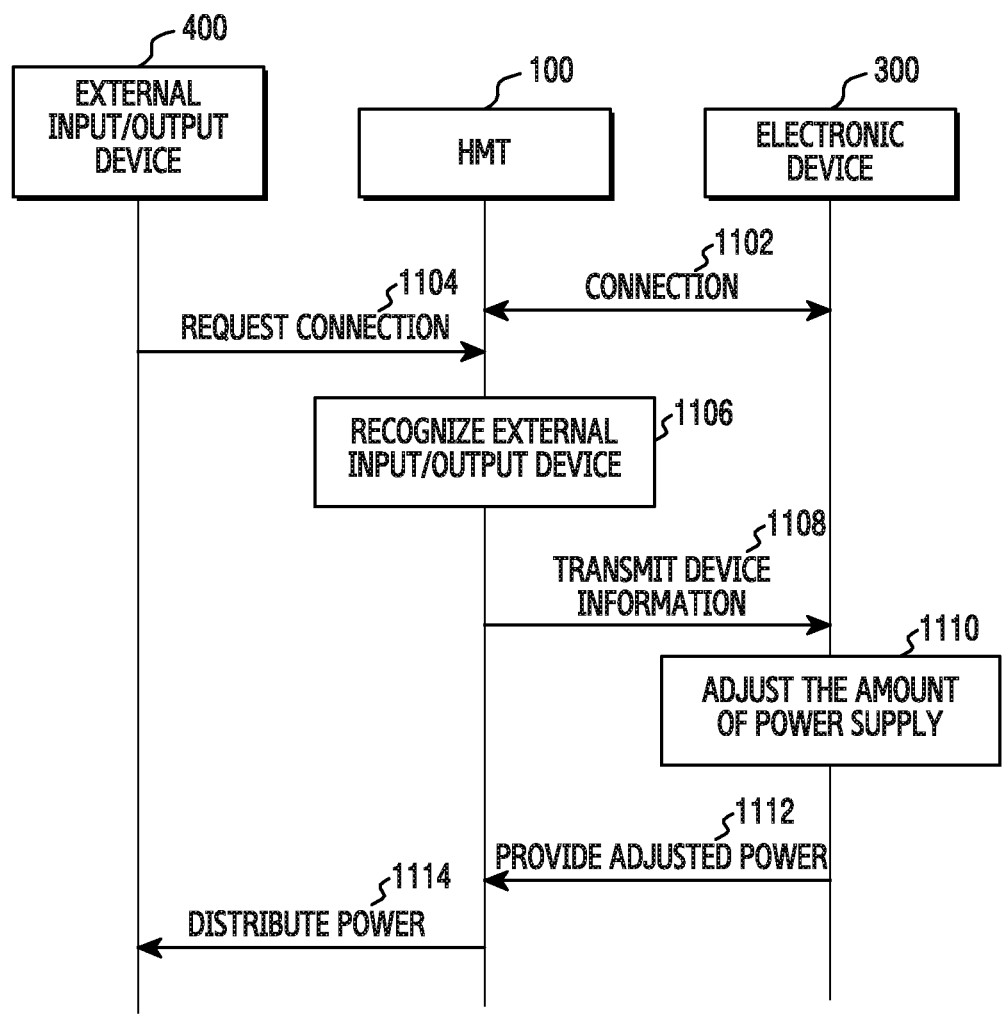
FIG. 11 is a flowchart illustrating a power control method between an external input/output device, an HMT device, and an electronic device according to various embodiments of the present disclosure.

FIG. 11 is a flowchart illustrating a power control method between an external input/output device, an HMT device, and an electronic device according to various embodiments of the present disclosure.

Referring to FIG. 11, an HMT of device 100 may be connected to an electronic device 300 in operation 1102. When a connection port of the electronic device 300 is connected to the first interface unit 112, the HMT device 100 may recognize the electronic device 300. The electronic device 300 may supply power to the HMT device 100.

In operation 1104, an external input/output device 400 may be connected to the HMT device 100.

In operation 1106, when a connection port of the external input/output device 400 is connected to the second interface unit 115, the HMT device 100 may recognize the external input/output device 400. The HMT device 100 may receive device information from the external input/output device 400.

In operation 1108, the HMT device 100 may transmit the device information. The device information may contain a device ID and an operation power of the external input/output device 400.

In operation 1110, the electronic device 300 may adjust the amount of power supply. The electronic device 300 may increase the amount of power supply as much as required for the operation of the external input/output device 400.

In operation 1112, the electronic device 300 may provide the adjusted power to the HMT device 100.

In operation 1114, the HMT device 100 may distribute the power supplied from the electronic device 300 to the external input/output device 400. The HMT device 100 may distribute some of the power supplied from the electronic device 300 as the operation power of the HMT device 100, and may distribute as much power as required for the operation of the external input/output device 400 to the external input/output device 400.

According to various embodiments, the interface unit, which is able to be connected to the external charger, is provided so that the power can be supplied from the external charger.

According to various embodiments, the power supplied from the external charger may be used for the electronic device in order to thereby reduce battery consumption of the electronic device.

According to various embodiments, the battery of the electronic device may be charged by using the power supplied from the external charger according to whether or not the HMT device is being worn.

While the present disclosure has been shown and described with reference to various embodiments thereof, it will be understood by those skilled in the art that various changes in forms and details may be made therein without departing from the spirit and scope of the present disclosure as defined by the appended claims and their equivalents.

What is claimed is:

1. A head-mounted-type electronic device comprising:
a first interface unit configured to be connected to a tablet or a smartphone;
a second interface unit configured to be connected to an external charger;
a sensor;
a switch unit; and
at least one processor configured to:
  detect a connection of the tablet or the smartphone to the head-mounted-type electronic device,
  operate the head-mounted-type electronic device by using a power of the tablet or the smartphone,
  detect the external charger during the operation,
  transmit state information according to the external charger to the tablet or the smartphone, and
  operate the head-mounted-type electronic device by using a power of the external charger,
wherein the at least one processor is further configured to determine whether the head-mounted-type electronic device is worn based on a signal detected by the sensor, and
wherein, if the head-mounted-type electronic device is worn, the at least one processor is further configured to:
  turn on the switch unit to operate the head-mounted-type electronic device by using the power supplied from the external charger, and
  transfer the power supplied from the external charger to the tablet or the smartphone.

2. The head-mounted-type electronic device of claim 1, wherein the at least one processor is further configured to control the transmission of the state information to the tablet or the smartphone through the first interface unit when the external charger is connected.

3. The head-mounted-type electronic device of claim 2, wherein the state information contains at least one of external power input information, wearing state information, or non-wearing state information.

4. The head-mounted-type electronic device of claim 1, wherein, if the external charger is connected and the head-mounted-type electronic device is not worn, the at least one processor is further configured to:
control the power supplied from the external charger to bypass the head-mounted-type electronic device, and
transfer the power supplied from the external charger to the tablet or the smartphone.

5. The head-mounted-type electronic device of claim 1, wherein, if an external input/output device is connected to the second interface unit, the at least one processor is further configured to transmit device information on the external input/output device to the power or the smartphone through the first interface unit.

6. The head-mounted-type electronic device of claim 5, wherein the at least one processor is further configured to:
control the head-mounted-type electronic device to operate by using the power of the tablet or the smartphone, and
transfer the power of the tablet or the smartphone to the external input/output device.

7. The head-mounted-type electronic device of claim 1, wherein the at least one processor is further configured to transfer power supplied from the external charger to the tablet or smartphone.

8. The head-mounted-type electronic device of claim 1, wherein the external charger is distinct from the tablet or smartphone.

9. The head-mounted-type electronic device of claim 1, wherein the at least one processor is further configured to stop operating the head-mounted-type electronic device by using the power of the tablet or the smartphone in response to the detecting of the external charger during the operation.

10. A power control method of a head-mounted-type electronic device, the power control method comprising:
detecting a connection of a tablet or a smartphone;
operating the electronic device by using a power of the tablet or the smartphone;
detecting an external power input during the operation;
transmitting state information according to the external power input to the tablet or the smartphone;
operating the electronic device by using a power of the external power input;
determining a wearing state of the head-mounted-type electronic device based on a signal detected by a sensor;
transmitting, if the electronic device is worn, the external power input information and the wearing state information;
operating by using the power of the external power input; and
transferring the power of the external power input to the tablet or the smartphone.

11. The method of claim 10, wherein the state information contains at least one of external power input information, wearing state information, or non-wearing state information.

12. The method of claim 10, further comprising:
transmitting, if the head-mounted-type electronic device is not worn, the external power input information and the non-wearing state information; and
controlling the power of the external power input to bypass the head-mounted-type electronic device and to be transferred to the tablet or the smartphone.

13. The method of claim 10, further comprising, if the connection of an external input/output device is detected, transmitting device information on the external input/output device to the tablet or the smartphone.

14. The method of claim 13, further comprising:
operating by using the power of the tablet or smartphone; and
transferring the power of the tablet or the smartphone to the external input/output device.

* * * * *